United States Patent [19]

Kang

[11] Patent Number: 5,775,469
[45] Date of Patent: Jul. 7, 1998

[54] ELECTRODYNAMIC STRUT WITH ASSOCIATED BRACING MECHANISM

[76] Inventor: Song D. Kang, 5540 Stonewall Pl. #22, Boulder, Colo. 80309

[21] Appl. No.: 631,944

[22] Filed: Apr. 15, 1996

[51] Int. Cl.[6] ............................ B60G 13/00; F16F 6/00
[52] U.S. Cl. ........................ 188/267; 267/136; 188/162
[58] Field of Search ........................ 267/275–78, 291, 267/66, 140.11, 140.15, 140.5, 170, 175, 177, 136; 188/159, 162, 267; 310/93, 94; 248/550, 566, 638

[56] References Cited

U.S. PATENT DOCUMENTS 5,348,124  9/1994  Harper .......................... 267/136

FOREIGN PATENT DOCUMENTS 3522221  2/1983  Germany ....................... 188/162

Primary Examiner—Matthew C. Graham
Attorney, Agent, or Firm—Kevin J. Zilka

[57] ABSTRACT

An electrodynamic strut coupled between two points within a structure and adapted to damp the vibration of the structure. The strut includes a spring mechanism for damping low level vibration of the strut and associated structure. The spring mechanism exhibits high stiffness for damping low level vibration of the strut until the vibration reaches a predetermined value. Upon the vibration reaching the predetermined value, the spring mechanism exhibits a low constant stiffness. Also included is an motion conversion mechanism including a ball screw and associated ball nut for converting linear vibrational motion of the strut to rotational motion. A motor/generator with a pair of associated contacts is in communication with the motion conversion mechanism and adapted to combat the rotational motion with generated torque. The torque is a function of the resistivity between the contacts. Further included is a variable resistance mechanism coupled between contacts associated with the motor/generator. The variable resistance mechanism is adapted to increase the resistivity thereof at a certain level of vibration of the strut thereby working in combination with the spring mechanism of the strut in order to damp high level vibration of the strut and associated structure. A plurality of bracing mechanisms are also employed for allowing the damping of vibrational movement without the use of large capacity struts.

15 Claims, 7 Drawing Sheets

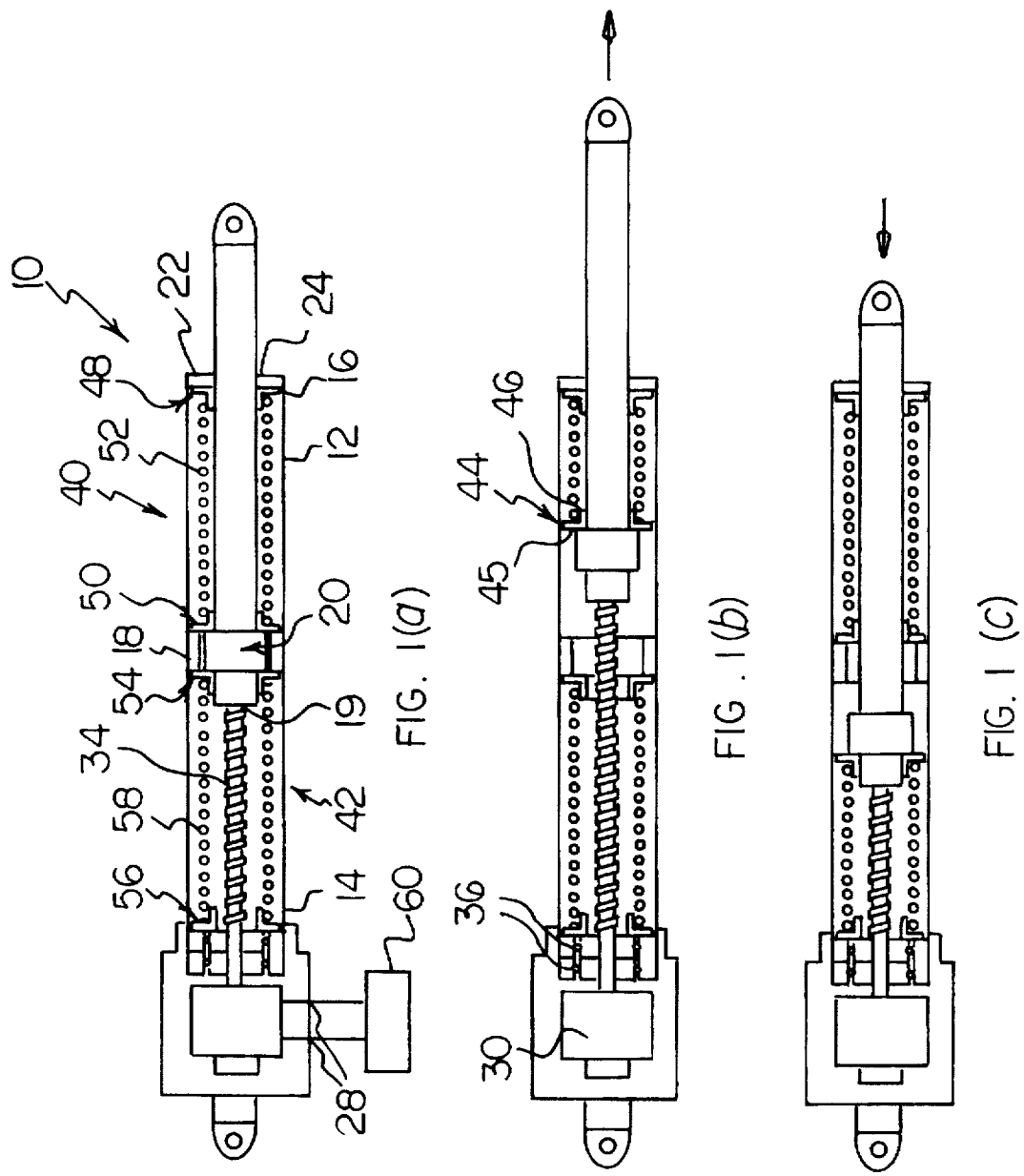

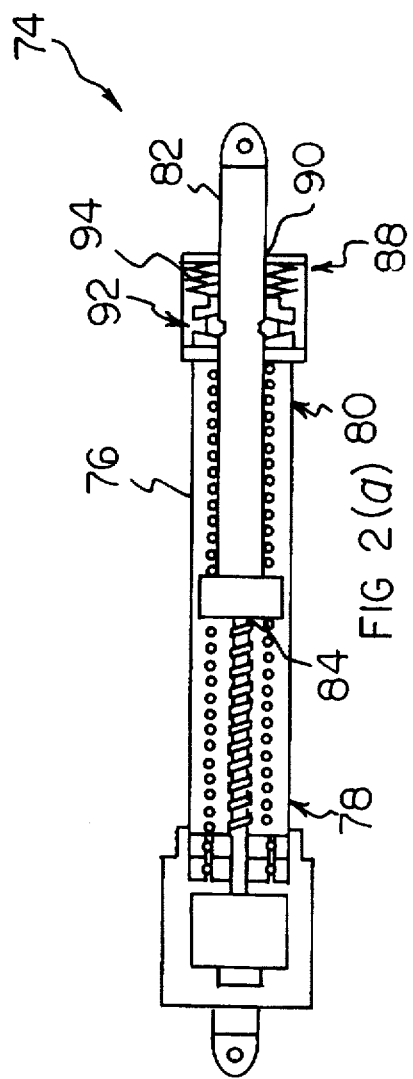
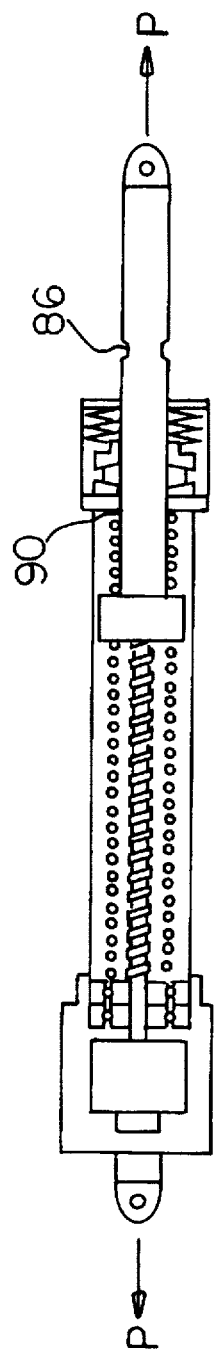
FIG 2(a)
FIG 2(b)

ELECTRODYNAMIC STRUT WITH ASSOCIATED BRACING MECHANISM

BACKGROUND OF THE INVENTION

1. Field of the Invention

The present invention relates to an electrodynamic strut with associated bracing mechanism and more particularly pertains to variably damping vibrational movement without the use of large capacity damper mechanisms.

2. Description of the Prior Art

The use of hydraulic and pneumatic shock absorbers is known in the prior art. More specifically, hydraulic and pneumatic shock absorbers heretofore devised and utilized for damping purposes are known to consist basically of familiar, expected and obvious structural configurations, notwithstanding the myriad of designs encompassed by the crowded prior art which have been developed for the fulfillment of countless objectives and requirements. Many problems exist with the current use of hydraulic and pneumatic shock absorbers. Such problems include: seal deterioration, require periodic inspection of associated fluid, required lubrication, utilization of components sensitive to radiation, and low efficiency due to friction.

By way of example, the prior art discloses in U.S. Pat. No. 5,296,785 to Miller a fail-safe vehicle suspension system including a switched reluctance motor.

U.S. Pat. No. 5,391,953 to Van de Veen discloses an electromechanical transducer.

U.S. Pat. No. 5,347,771 to Kobori et al. disclose a high damping device for seismic response controlled structure.

U.S. Pat. No. 5,349,712 to Kawashima et al. disclose a variable damper for bridges.

U.S. Pat. No. 5,022,201 to Kobori et al. disclose an apparatus for accelerating response time of an active mass damper earthquake atenuator.

U.S. Pat. No. 5,311,709 to Kobori et al. disclose a variable damping device for a seismic controlled structure.

In this respect, the electrodynamic strut with associated bracing mechanism according to the present invention substantially departs from the conventional concepts and designs of the prior art, and in so doing provides an apparatus primarily developed for the purpose of variably damping vibrational movement without the use of large capacity damper mechanisms.

Therefore, it can be appreciated that there exists a continuing need for a new and improved electrodynamic strut with associated bracing mechanism which can be used for variably damping vibrational movement without the use of large capacity damper mechanisms. In this regard, the present invention substantially fulfills this need.

SUMMARY OF THE INVENTION

In view of the foregoing disadvantages inherent in the known types of hydraulic and pneumatic shock absorbers now present in the prior art, the present invention provides an improved electrodynamic strut with associated bracing mechanism. As such, the general purpose of the present invention, which will be described subsequently in greater detail, is to provide a new and improved electrodynamic strut with associated bracing mechanism which has all the advantages of the prior art and none of the disadvantages.

To attain this, the present invention essentially comprises an electrodynamic strut with variable stiffness, variable damping and associated adaptive bracing mechanism model for use with seismic structures/buildings vibration control, bridges vibration control, load relieving adaptive space structures, nuclear power plants, and the like. As shown in FIG. 1(a), the electrodynamic strut includes a hollow support cylinder with a first end and a second end. A neutral fixed ring is coupled to an interior surface of the support cylinder at a central extent thereof. An inboard end of the telescoping rod is situated within an interior space of the support cylinder. The telescoping rod has a threaded bore axially formed therein which defines a ball nut. A flange is formed adjacent to the second end of the telescoping rod on an outer surface thereof. An end cap is coupled to the second end of the support cylinder with a concentric aperture formed therein for allowing the slidable movement of the telescoping rod within the support cylinder. Also included is direct current motor/generator with a pair of associated contacts coupled to the first end of the support cylinder. A stator of the motor/generator is fixed with relation to the support cylinder. A rotor of the motor/generator is situated within the stator in axial alignment with the telescoping rod. As such, a torque is generated upon the rotation of the rotor as a function of the resistance between the contacts. Integrally formed with the rotor and extended axially within the entire length of the support cylinder is a ball screw. The ball screw is screwably inserted within the ball nut of the telescoping rod. The ball screw is supported at the first end of the support cylinder by a pair of thrust bearings secured about the ball screw for allowing the free rotation thereof. With reference still to FIG. 1(a), a first spring compartment and a second spring compartment are also included. Each spring compartment includes a pair of thrust rings comprising a washer with a flange integrally formed about an aperture thereof. The flange is extended normally from the washer. The first spring compartment has a first thrust ring which abuts the end cap. The flange of the first thrust ring extends toward the first end of the support cylinder. A washer of a second thrust ring abuts both the fixed ring and the flange of the telescoping rod in a neutral orientation with the flange of the thrust ring extending toward the second end of the support cylinder. A pre-loaded helical spring is situated about the telescoping rod between the washer of both the first thrust ring and the second thrust ring. The second spring compartment has a first thrust ring with the washer thereof abutting both the fixed ring and the flange of the telescoping rod in a neutral orientation. The flange of the first thrust ring extends toward the first end of the support cylinder. A second thrust ring abuts the thrust bearing with the flange thereof extending towards the second end of the support shaft. Another pre-loaded helical spring is situated between the washer of both the first thrust ring and the second thrust ring. In operation, as shown in FIGS. 1(b) & 1(c), the ball nut of the telescoping rod is adapted to slide linearly between springs compartments. The springs exhibit high stiffness for damping low level vibration of the strut until said vibration reaches a predetermined value. Upon the vibration reaching the predetermined value, the springs exhibit a low constant stiffness. Further included is a passive mode variable resistive network comprising a motor winding resistance and a rectifier circuit. The motor winding resistance and rectifier circuit are connected in series with the contacts of the motor/generator for producing a direct current at an output of the rectifier circuit upon the linear motion of the telescoping rod. The resistive network further includes a three port adjustable positive regulator, a potentiometer, and a load resistor. Such components are connected in series between the output and an input of the rectifier. A line is connected between an adjustment port of the adjustable positive regulator and a node positioned between the load resistor and the potentiometer. The adjustable positive regulator of the resistive network is thus tailored to adjust an output voltage thereof via the potentiometer. The adjustable positive regulator thus maintains a constant voltage between an output thereof and the adjustment port. In use, the resistive network and motor/generator work in combination with the springs of the strut in order to damp high level vibration of the strut. Working in conjunction with the electrodynamic strut is a bracing mechanism which reduces the required size of the associated strut.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved electrodynamic strut with associated bracing mechanism which has all the advantages of the prior art hydraulic and pneumatic shock absorbers and none of the disadvantages.

It is another object of the present invention to provide a new and improved electrodynamic strut with associated bracing mechanism which may be easily and efficiently manufactured and marketed.

It is a further object of the present invention to provide a new and improved electrodynamic strut with associated bracing mechanism which is of a durable and reliable construction.

An even further object of the present invention is to provide a new and improved electrodynamic strut with associated bracing mechanism which is susceptible of a low cost of manufacture with regard to both materials and labor, and which accordingly is then susceptible of low prices of sale to the consuming public, thereby making such electrodynamic strut economically available to the buying public.

Still yet another object of the present invention is to provide a new and improved electrodynamic strut with associated bracing mechanism which provides in the apparatuses and methods of the prior art some of the advantages thereof, while simultaneously overcoming some of the disadvantages normally associated therewith.

Still another object of the present invention is to variably damp vibrational movement without the use of large capacity damper mechanisms.

Yet another object of the present invention is to provide an electrodynamic strut with no seals to wear out, no periodic inspections to check fluid, no required lubrication, no radiation sensitive parts, and low friction.

Lastly, it is an object of the present invention to provide a new and improved electrodynamic strut coupled between two points within a structure and adapted to damp the vibration of the structure. The strut includes a spring mechanism for damping low level vibration of the strut and associated structure. The spring mechanism exhibits high stiffness for damping low level vibration of the strut until said vibration reaches a predetermined value. Upon the vibration reaching the predetermined value, the spring mechanism exhibits a low constant stiffness. Also included is an motion conversion mechanism including a ball screw and associated ball nut for converting linear vibrational motion of the strut to rotational motion. A motor/generator with a pair of associated contacts is in communication with the motion conversion mechanism and adapted to combat said rotational motion with generated torque. The torque is a function of the resistivity between the contacts. Further included is a variable resistance mechanism coupled between contacts associated with the motor/generator. The variable resistance mechanism is adapted to increase the resistivity thereof at a certain level of vibration of the strut thereby working in combination with the spring mechanism of the strut in order to damp high level vibration of the strut and associated structure. A plurality of bracing mechanisms are also employed for allowing the damping of vibrational movement without the use of large capacity struts.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1(a) is a side plan view of the first embodiment of the electrodynamic strut with associated bracing mechanism constructed in accordance with the principles of the present invention, wherein the strut is in a neutral position.

FIG. 1(b) is a side plan view of the first embodiment of the electrodynamic strut in an extended orientation.

FIG. 1(c) is a side plan view of the first embodiment of the electrodynamic strut in a retracted orientation.

FIG. 2(a) is a side plan view of the second embodiment of the electrodynamic strut in a neutral orientation.

FIG. 2(b) is a side plan view of the second embodiment of the electrodynamic strut in an extended orientation.

Similar reference characters refer to similar parts throughout the several views of the drawings.

DESCRIPTION OF THE PRESENT INVENTION

Figure 3:
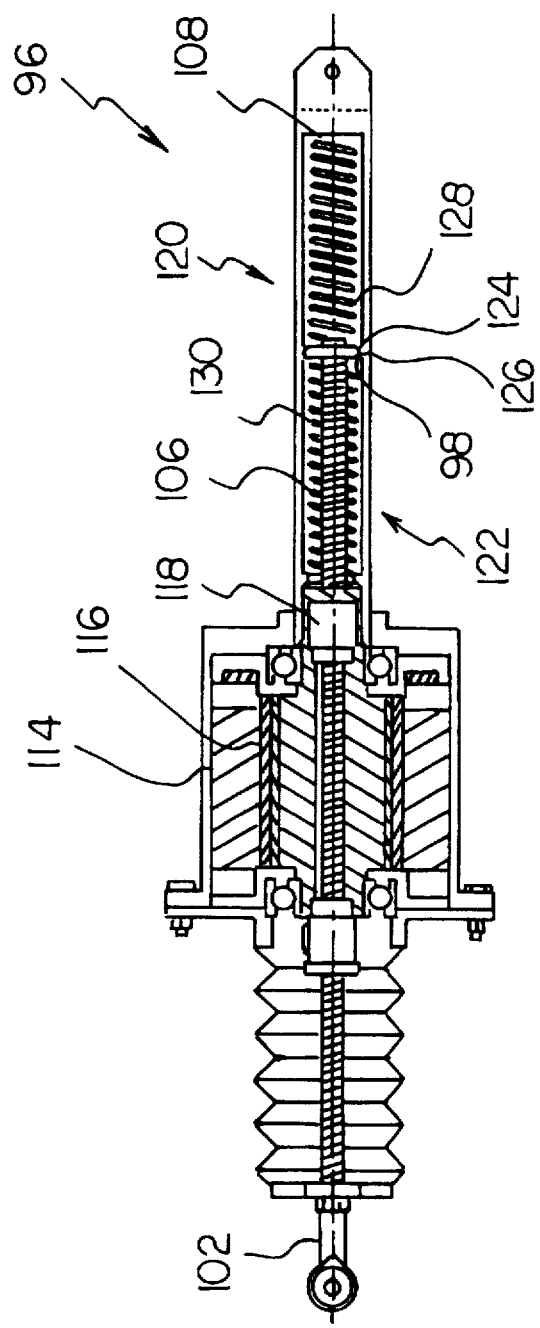
FIG. 3 is a side plan view of the third embodiment of the electrodynamic strut.

With reference now to the drawings, a new and improved electrodynamic strut with associated bracing mechanism embodying the principles and concepts of the present invention and generally designated by the reference numeral 10 will be described.

The present invention, the new and improved electrodynamic strut with variable stiffness, variable damping, and associated bracing mechanism, is comprised of a plurality of components. Such components in their broadest context include a strut and bracing mechanism. Such components are individually configured and correlated with respect to each other so as to attain the desired objective.

More specifically, it will be noted that the system 10 of the present invention includes an electrodynamic strut with variable stiffness, variable damping and associated adaptive bracing mechanism model for use with seismic structures/ buildings vibration control, bridges vibration control, load relieving adaptive space structures, nuclear power plants, and the like.

As shown in FIG. 1(a), the electrodynamic strut includes a hollow support cylinder 12 with a first end 14 and a second end 16. A neutral fixed ring 18 is coupled to an interior surface of the support cylinder at a central extent thereof. An inboard end of the telescoping rod is situated within an interior space of the support cylinder. The telescoping rod has a threaded bore axially formed therein which defines a ball nut 19. A flange 20 is formed adjacent to the second end of the telescoping rod on an outer surface thereof. An end cap 22 is coupled to the second end of the support cylinder with a concentric aperture 24 formed therein for allowing the slidable movement of the telescoping rod within the support cylinder.

Also included is direct current motor/generator 26 coupled to the first end of the support cylinder with a pair of associated contacts 28. A stator of the motor/generator is fixed with relation to the support cylinder. A rotor is situated within the stator in axial alignment with the telescoping rod. As such, a torque is generated upon the rotation of the rotor as a function of the resistance between the contacts. It should be noted that any conventional motor/generator may be employed in the present invention including a permanent magnetic direct current brush motor, permanent magnetic direct current brushless motor, generator, or step motor.

Integrally formed with the rotor and extended axially within the entire length of the support cylinder is a ball screw 34. The ball screw is screwably inserted within the ball nut of the telescoping rod. The ball screw is supported at the first end of the support cylinder by a pair of thrust bearings 36 secured about the ball screw for allowing the free rotation thereof.

The linear motion design using the ball screw and nut is pursued because of its many advantages. Ball screws operate at over 90 percent efficiency. They provide smooth, stepless, linear actuation over full stroke length and maintain high repeatability with precise positioning. The strut consists of a ball screw with a helical groove, a ball nut with a similar groove and circuits of precision bearing balls that recirculate in the groove between the screw and the nut. This converts the rotary into linear motion as either the screw or nut turns and the other component moves in a linear direction. The ball nut and screw mechanism eliminates sliding friction and stick-slip, reducing the size of power and drive train components. In the linear to rotary motion mechanism, the ball screw is backdriven by the ball nut that is attached to the linearly moving thrust tube. The ball screw must be smoothly backdriven in order to drive the rotary force devices effectively. It reduces the high resisting forces on the screw caused by the linear speed motion. The backdriving of the ball screw is related to the screw lead size, which is the translation per revolution of the screw. The allowable lead size for smooth backdriving is recommended to be larger than one third of the screw diameter. In this design, the lead size is an important parameter that amplifies the damping torque into damping force in a mechanical way, and achieves smooth backdriving at high speed motion.

With reference still to FIG. 1(a), a first spring compartment 40 and a second spring compartment 42 are included. Each spring compartment includes a pair of thrust rings 44 comprising a washer 45 with a flange 46 integrally formed about an aperture thereof. The flange is extended normally from the washer. The first spring compartment has a first thrust ring 48 which abuts the end cap. The flange of the first thrust ring extends toward the first end of the support cylinder. A washer of a second thrust ring 50 abuts both the fixed ring and the flange of the telescoping rod in a neutral orientation with the flange of the thrust ring extending toward the second end of the support cylinder. A pre-loaded helical spring 52 is situated about the telescoping rod between the washer of both the first thrust ring and the second thrust ring.

The second spring compartment has a first thrust ring 54 with the washer thereof abutting both the fixed ring and the flange of the telescoping rod in a neutral orientation. The flange of the first thrust ring extends toward the first end of the support cylinder. A second thrust ring 56 abuts the thrust bearing with the flange thereof extending toward the second end of the support shaft. A pre-loaded helical spring 58 is situated about the ball screw between the washer of both the first thrust ring 54 and the second thrust ring 56.

In operation, as shown in FIGS. 1(b) & 1(c), the ball nut of the telescoping rod is adapted to slide linearly between the springs compartments. The springs exhibit high stiffness for damping low level vibration of the strut until said vibration reaches a predetermined value. Upon the vibration reaching the predetermined value, the springs exhibit a low constant stiffness.

Figure 5:
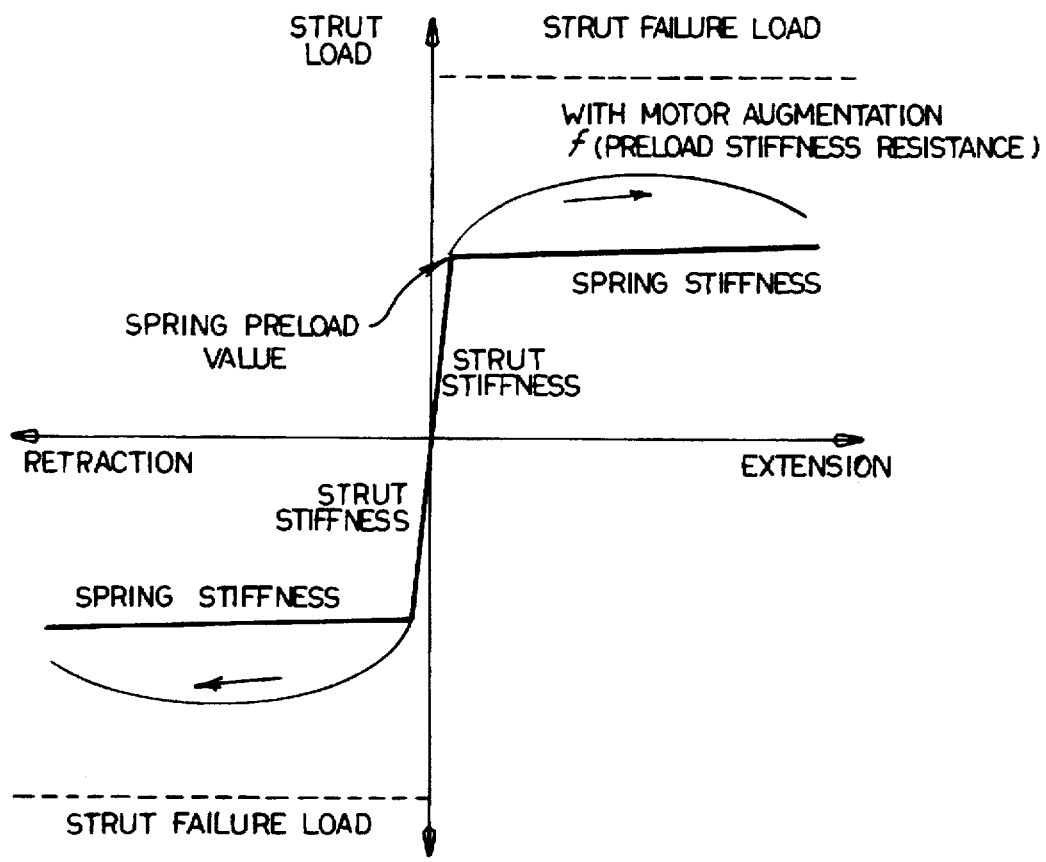
FIG. 5 is a graph depicting the operation of the present invention.
Figure 6:
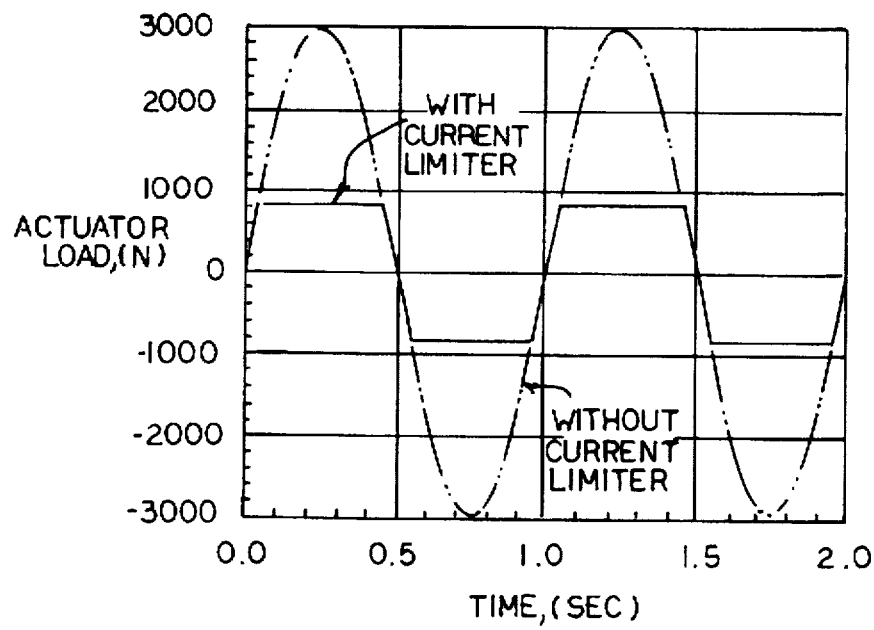
FIG. 6 is a graph depicting the vibrational movement of a structure with and without the passive mode variable resistive network.

The pre-loaded coil spring performs only during periods of excessive loading. The stiffness of the coil spring is designed to be significantly lower than that of the regular strut, so that the strut force remains close to constant through the strut extension for desirable energy absorption without motor augmentation. The level of preloading for the spring is selected to be low enough to assure that no failure will occur in the structure, yet high enough to absorb the applied load impulse within acceptable deflection and time requirements. The concept of limiting the axial load to an adjustable value, using a pre-loaded coil spring, is presented with the load extension behavior represented by a heavy solid line in FIG. 5. From the strut load response, the strut stiffness reduces from the high rod/casing stiffness to the low spring stiffness resulting in the variable stiffness of the strut.

Figure 4:
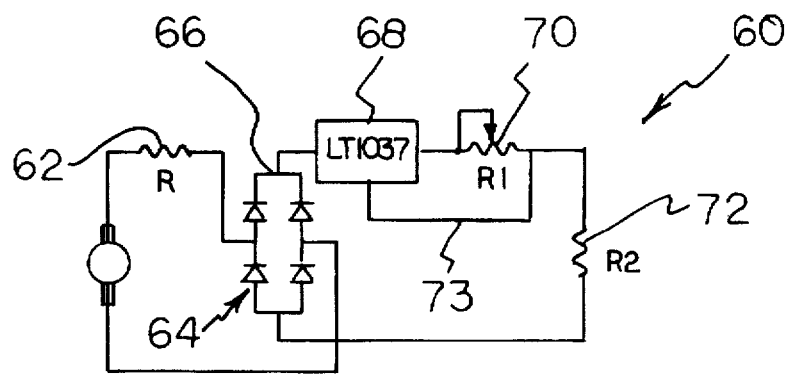
FIG. 4 is a schematic of the passive mode variable resistive network.

Further included is a passive mode variable resistive network 60, as shown in FIG. 4, comprising a motor winding resistance 62 and a rectifier circuit 64. The motor winding resistance and rectifier circuit are connected in series with the contacts of the motor/generator for producing a direct current at an output 66 of the rectifier circuit upon the linear motion of the telescoping rod. The resistive network further includes a three port adjustable positive regulator 68, a potentiometer 70, and a load resistor 72. Such components are connected in series between the output and an input of the rectifier. A line 73 is connected between an adjustment port of the adjustable positive regulator and a node positioned between the load resistor and the potentiometer. The adjustable positive regulator of the resistive network is thus tailored to adjust an output voltage thereof via the potentiometer. The adjustable positive regulator thus maintains a constant voltage between an output thereof and the adjustment port. In use, the resistive network and motor/generator work in combination with the springs of the strut in order to damp high level vibration of the strut.

The above mentioned resistive network limits the current to preset levels to avoid excessive loading during the actuator operation. The circuit is triggered by the current generated across the loading resistance shunted to the motor only for excessive current values; otherwise, the circuit provides the forces which are proportional to speed (or proportional to current). When the circuit is connected to the motor armature lines, the circuit is activated to clip off the excessive current near to a constant, resulting in a constant load during operation. For a current value generated by the motor which is lower than the prescribed current, the current response would be proportional to the motor speed. In the present circuit, a 3-terminal adjustable positive regulator is employed as a current limiter. The regulator (LT1037) which is a standard and commercially available was used for its high current rating (10 Amps). The regulator adjusts its output voltage to maintain a constant 1.25 Volts from the output to the adjustment terminal. A variable resistor is used to adjust the current limit. The load resistor, provides additional heat dissipation capabilities. Both the regulator and load resistor are operated with a proper heat sink situated about them. It should be noted that an inductance may be included in the design of the present circuit coupled to the load resistance.

Should the resistive network be replaced by a voltage source, the present invention may be activated in an active mode wherein the motor/generator can be rotated electrically and the strut exercised over a given displacement or against a given force. Hence, the strut can be adjusted, within ranges to have high initial stiffness, reduced long stroke stiffness, variable hysteric damping, and self activating or testing function. A switch mode current limiter in an active mode may be employed for high energy dissipation capacity.

As an option, an additional circuit may be included for applying power to the motor/generator means thus actively manipulating the operability of the strut.

During use of the present invention in the passive mode thereof, the motor/generator is used in the generator mode for producing damping force. The motor as an electrodynamic rotary shock absorber is rotated by the mechanical converter which transforms the linear into rotary motion, and its rotation produces electrical current to create a damping force. In using the motor as a generator, the armature lines of the motor are shunted to a resistor. By varying the resistance of the resistive network, variable damping is achieved. In this operation, the damping of the motor is defined as a function of a loading resistance. Note that since a commercially available motor is used for the damping portion of the strut, the maximum damping is limited at a short circuit state, and there is no option to increase its maximum value, whereas the damping vanishes at the open circuit state. In particular, the damping force produced by a brush type motor is characterized by a linear viscous damping, which is proportional to the velocity.

Alternate Embodiments

As shown in FIGS. 2(a)–2(c), an alternate embodiment 74 of the present invention is included. The alternate embodiment includes a hollow support cylinder 76 with a first end 78 and a second end 80. A telescoping rod 82 has an outboard end an inboard end. The inboard end of the telescoping rod is situated within an interior space of the support cylinder. The telescoping rod has a threaded bore 84 axially formed therein and an indention 86 centrally formed on an outer surface thereof. A detent unit 88 is coupled to the second end of the strut. The detent unit includes a housing having a pair of apertures 90 formed in opposite faces thereof. Such apertures are in axial alignment with the hollow support cylinder so that the telescoping rod may be slidably situated therein. A pair of detents 92 are forced in communication with the telescoping rod via a pair of belleville springs 94. Thus, the detents insert within the indentations when the telescoping rod is oriented in a neutral configuration.

Yet another alternate embodiment 96, as shown in FIG. 3, is also included. The present embodiment includes a hollow support cylinder 98 with a first end and a second end. A neutral fixed ring 100 is coupled to an interior surface of the support cylinder at a central extent thereof. A telescoping rod 102 has an inboard end situated within an interior space of the support cylinder. A disk 104 is coupled to the inboard end of the telescoping rod. The telescoping rod also includes a threaded outer surface 106 which defines a ball screw. An end cap 108 is coupled to the second end of the support cylinder.

Also included in the embodiment shown in FIG. 3 is a direct current motor/generator 110 with a pair of associated contacts. The motor/generator is coupled to the first end of the support cylinder. A stator 114 of the motor/generator is fixed with relation to the support cylinder. A rotor 116 is situated within the stator with a bore formed therein. A pair of ball nuts 118 are coupled to both ends of the rotor. The telescoping rod is situated within the ball nuts thereby effecting the rotation of the rotor upon the linear movement thereof. A torque is generated as a function of the resistance between the contacts upon the rotation of the rotor.

Further included in the present embodiment is a first spring compartment 120 and a second spring compartment 122. Both spring compartments include thrust rings similar to those of the first embodiment. The first spring compartment has a thrust ring 124 with the washer thereof abutting both a fixed washer 126 centrally fixed within the support cylinder and the disk of the telescoping rod. The flange of the thrust ring extends toward the second end of the support cylinder. A pre-loaded helical spring 128 is situated between the end cap and the thrust ring 124. The second spring compartment has a thrust ring 129 with the washer thereof abutting both the fixed washer and the disk of the telescoping rod in a neutral orientation. The flange of the thrust ring 129 extends toward the first end of the support cylinder. A pre-loaded helical spring 130 is situated about the telescoping rod between the rotor and the washer of the thrust ring 129. The present embodiment is ideal for many special purposes, for instance, high frequency motion.

Associated Adaptive Bracing Mechanisms

Since large control forces are required of strong earthquake excited structures, the electrodynamic struts require a large capacity of energy absorption. In order to minimize the need for large capacity electrodynamic struts, a typical load absorbing mechanism is provided. For the placement of electrodynamic struts in structures, the use of batten actuated structures design is an attractive approach for a number of reasons. The primary reason for such use is that the battens are not in the direct load path and accordingly operational loads in the electrodynamic struts are small. An additional feature of this batten actuated concept is that by introducing small amount of initial offset in the structure, a wide range of actuator performance can be tailored.

Figure 7:
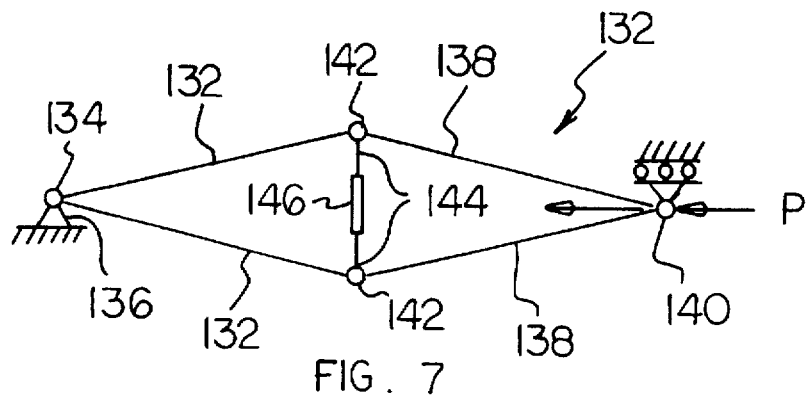
FIG. 7 is a side view of the first bracing mechanism.

A first bracing mechanism, as shown in FIG. 7, includes a first pair of braces 132 oriented in a V-shaped configuration. The first pair of braces has first ends 134 pivotally coupled to a first part of a structure 136. Also included are a second pair of braces 138 oriented in a V-shaped configuration. The second pair of braces includes first ends 140 pivotally coupled to another part of the structure. The braces each terminate at second ends 142 with each second end of the first pair of braces pivotally coupled to an associated second end of the second pair of braces. The second ends of the braces thus define a pair of pivot joints 144 which vibrate coincidentally upon the vibration of the structure. An electrodynamic strut 146 is pivotally coupled between the pivot joints for the purpose of damping such vibration.

Figure 8:
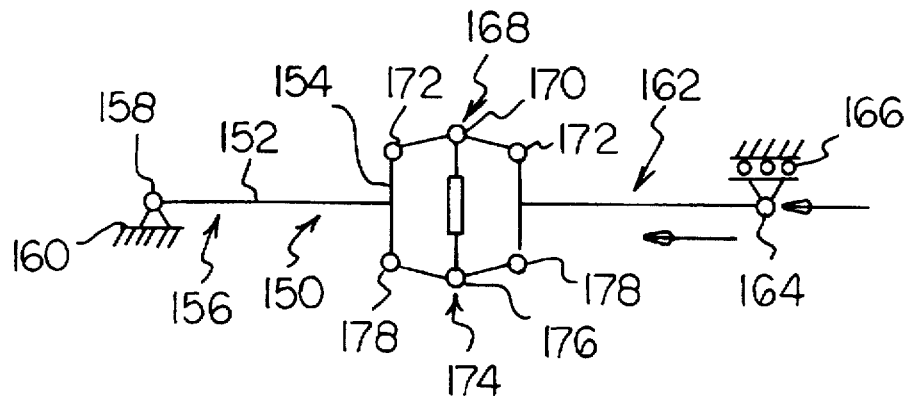
FIG. 8 is a side view of the second bracing mechanism.

Yet another bracing mechanism shown in FIG. 8. The bracing mechanism includes a pair of collapsed T-shaped members 150. The T-shaped members each include a horizontally situated elongated extent 152. A vertically situated short extent 154 is centrally coupled to a first end of the elongated extent. The T-shaped members include a first T-shaped member 156 having a second end 158 of the elongated extent thereof pivotally coupled to a stationary point 160. Also included is a second T-shaped member 162 having a second end 164 of the elongated extent thereof pivotally coupled to a horizontally movable point 166. The bracing mechanism further includes a first pair of braces 168 oriented in a V-shaped configuration. The V-shaped braces have first ends 170 pivotally coupled to each other thus defining a pivot joint. They also include second ends 172 each coupled to a first end of the short extent of each T-shaped member. Also included is a second pair of braces 174 oriented in a V-shaped configuration with first ends 176 pivotally coupled to each other thus defining another pivot joint. The second ends 178 of the second pair of braces are each coupled to a second end of each short extent of each T-shaped member. An electrodynamic strut is pivotally coupled between the pivot joints for damping the horizontal movement of the horizontally movable point.

Application of electrodynamic strut with adaptive bracing mechanism

Figure 9:
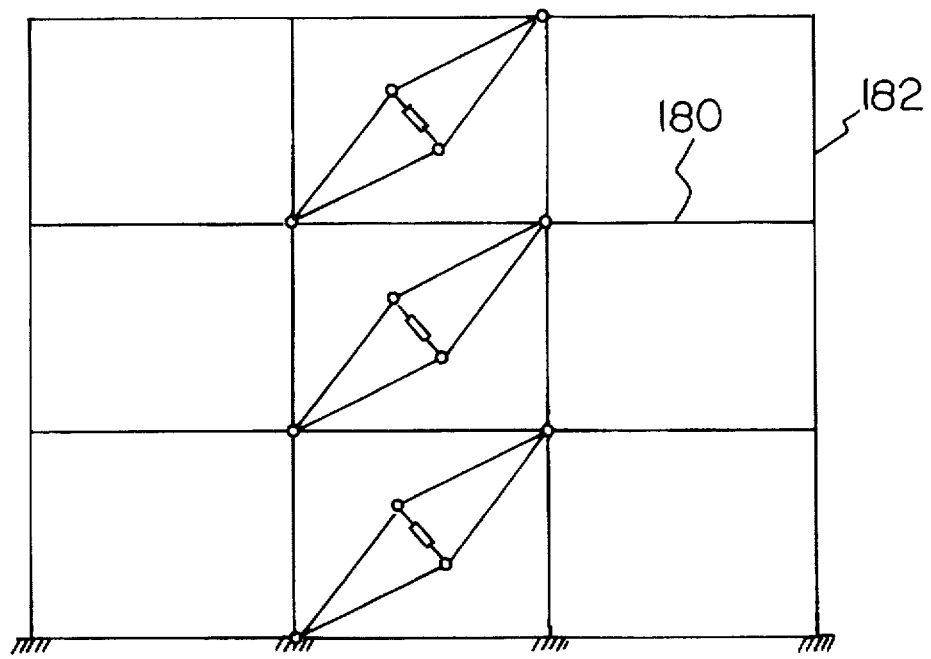
FIG. 9 is a side elevational view of an application of the first bracing mechanism.

The present invention may be employed in a structure, as shown in FIG. 9, comprising a plurality of interconnected horizontal beams 180 and vertical beams 182. Such beams define a multiplicity of rectilinear faces. In use, a plurality of the bracing mechanisms are coupled between the rectilinear faces for damping the vibration thereof.

Figure 10:
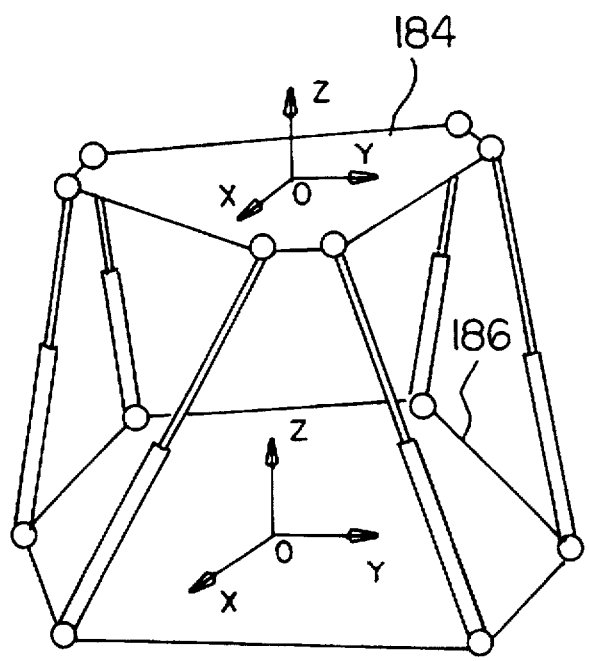
FIG. 10 is a perspective view of yet another application of the present invention.

As shown in FIG. 10, yet another structure includes a conventional spatial structure comprising a truss structure. A first plate 184 with six corners is a moving table to sit structures. A second plate 186 is also included with six corners. The second plate is situated above the first plate. A plurality of electrodynamic struts are each coupled between the corners thereof for maintaining the second plate in a neutral position with respect to the first plate. The present application has six degrees of freedom. Any of the previous bracing mechanisms may be employed in lieu of the struts shown for reducing the required size thereof.

Figure 11:
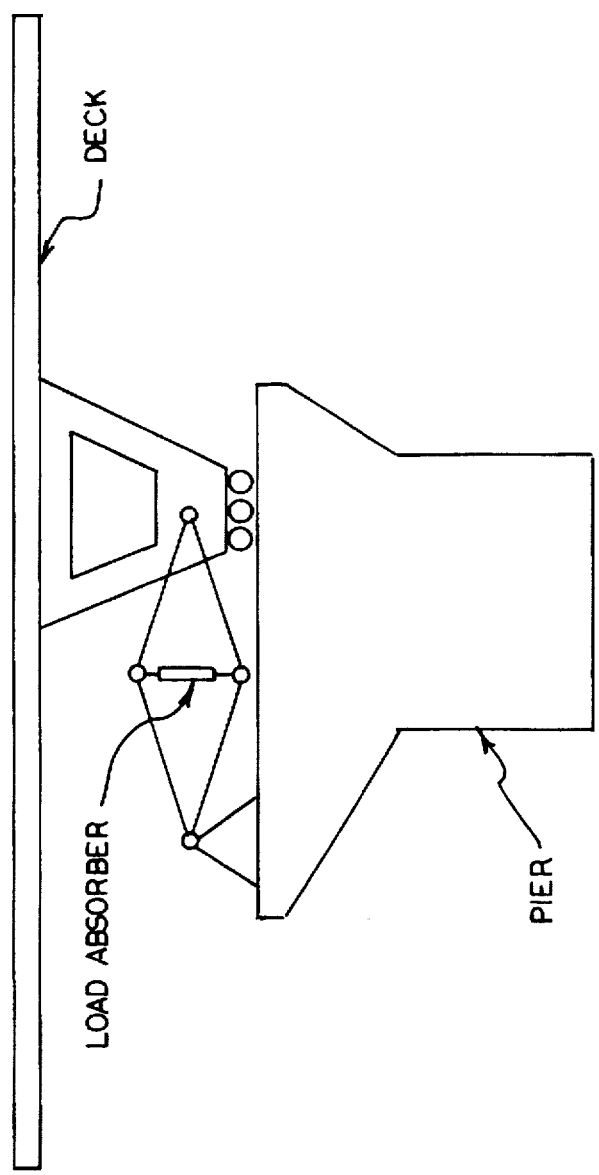
FIG. 11 is a side plan view of still another application of the present invention.

In FIG. 11, the electrodynamic strut and adaptive bracing mechanism of FIG. 7 are employed in a bridge vibration control schematic. Such application of the present invention damps the horizontal vibration of an associated bridge.

The present invention is an actuator for absorbing high transient vibrational forces, which is designed to be operated passively, or actively as needed and in as robust an operation as possible. The electromechanical construction of the actuator eliminates maintenance problems associated with hydraulic or pneumatic actuators. The actuator saturation force which is nearly constant is implemented by limiting the current generated by the motor generator connected to a current limiter during its operation. For the implementation of the proposed nonlinear control scheme, a current limiter is disclosed, which does not require any additional power or active devices. A switch mode current limiter in an active mode may be employed for high energy dissipation capacity. The proposed control scheme is expected to apply to a decentralized control, which is more robust and stable. An adaptive bracing mechanism is provided to reduce the need for large capacity actuators. Since the actuator is placed in the indirect load path in the structure, the proposed mechanism can be tailored primarily to reduce the large control forces of the actuators in a mechanical way.

Application of the present invention includes and is not limited to:

Active/passive suspension, engine mounting mechanisms, smart bumper

Most building structures for earthquake, or inadvertent structural overload

Dual shake table/omni-directional isolation absorber

Adaptive bridges

Nuclear power plant, or chemical vessel tank

Machineries platform and robotics

Mining equipment

Military vehicles including tanks

Wind generator

Helicopter blades

Airplane wings (flutter) and its landing gears

Submarines' cradle system, missile launching system

Marine platform for oil exploration

Wave power plant

Anchorage systems for marine structures

Sun decks, engine hatches

Antenna support structures for communication satellites

Docking port

Solar panels for satellite or space station

Rocket propulsion system

Space based radar feed support beams

Space shuttle and space station remote manipulator systems

Advanced space construction, robotic manipulator arms

Earth observation microwave radiometer feed support beams

High precision reflector spacecraft

Lunar transfer vehicles

Piers bridges electric vehicles mobile suspensions mechanisms

Any deployable or erectable truss for space applications

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An electrodynamic strut with variable stiffness, variable damping and associated adaptive bracing mechanism model for use with seismic structures/buildings vibration control, bridges vibration control, load relieving adaptive space structures, nuclear power plants, the electrodynamic strut comprising, in combination:

a bracing mechanism including a first pair of braces oriented in a V-shaped configuration with first ends pivotally coupled to a first part of a structure and a second pair of braces orientated in a V-shaped configuration with first ends pivotally coupled to another part of the structure, wherein the braces each terminate at a second end with each second end of the first pair of braces pivotally coupled to an associated second end of the second pair of braces thus defining a pair of pivot joints which vibrate coincidentally upon the vibration of the structure;

a strut pivotally coupled between the pivot joints of the bracing mechanism and adapted to damp the vibration of the structure; the strut including a hollow support cylinder with a first end and a second end; a neutral fixed ring coupled to an interior surface of the support cylinder at a central extent thereof; a telescoping rod with an outboard end hingably coupled to one of the pivot joints of the bracing mechanism and an inboard end situated within an interior space of the support cylinder with the telescoping rod having a threaded bore axially formed therein thus defining a ball nut and further having a flange formed adjacent to the second end thereof on an outer surface thereof; an end cap coupled to the second end of the support cylinder with a concentric aperture formed therein for allowing the slidable movement of the telescoping rod within the support cylinder; a direct current motor/generator with a pair of associated contacts coupled to the first end of the support cylinder with a stator fixed with relation to the support cylinder and a rotor situated within the stator in axial alignment with the telescoping rod, wherein a torque is generated as a function of the resistance between the contacts upon the rotation of the rotor; a ball screw formed integrally with the rotor and extended axially within the entire length of the support cylinder and further screwably inserted within the ball nut of the telescoping rod, the ball screw supported at the first end of the support cylinder by a pair of thrust bearings secured about the ball screw for allowing the free rotation thereof; a first spring compartment and a second spring compartment each including a pair of thrust rings comprising a washer with a flange integrally formed about an aperture thereof and extended normally therefrom, the first spring compartment having a first thrust ring abutting the end cap with the flange thereof extending toward the first end of the support cylinder, a second thrust ring with the washer thereof abutting both the fixed ring and the flange of the telescoping rod in a neutral orientation with the flange of the second thrust ring extending towards the second end of the support cylinder, and a pre-loaded helical spring situated about the telescoping rod between the washer of both the first thrust ring and the second thrust ring, the second spring compartment having a first thrust ring with the washer thereof abutting both the fixed ring and the flange of the telescoping rod in a neutral orientation with the flange of the first thrust ring extending toward the first end of the support cylinder, a second thrust ring abutting the thrust bearing with the flange thereof extending toward the second end of the support shaft, and a pre-loaded helical spring situated about the ball screw between the washer of both the first thrust ring and the second thrust ring; whereby the ball nut of the telescoping rod is adapted to slide linearly between the springs compartments and the springs exhibit high stiffness to damp low level vibration of the strut until said vibration reaches a predetermined value, wherein upon the vibration reaching the predetermined value, the springs exhibit a low constant stiffness; and a passive mode variable resistive network comprising a motor winding resistance and a rectifier circuit connected in series with the contacts of the motor/generator for producing a direct current at an output of the rectifier circuit upon the linear motion of the telescoping rod, the resistive network further comprising a three port adjustable positive regulator, a potentiometer, and a load resistor connected in series between the output and an input of the rectifier with a line connected between an adjustment port of the adjustable positive regulator and a node positioned between the load resistor and the potentiometer, whereby the adjustable positive regulator is adapted to adjust an output voltage thereof via the potentiometer thus maintaining a constant voltage between an output thereof and the adjustment port thus allowing the passive mode variable resistive network to work in combination with the springs of the strut in order to damp high level vibration of the strut and associated bracing mechanism.

2. An electrodynamic strut coupled between two points within a structure and adapted to damp the vibration of the structure, the strut comprising:

spring means for damping low level vibration of the strut and the structure, whereby the spring means exhibit high stiffness to damp low level vibration of the strut until said vibration reaches a predetermined value, wherein upon the vibration reaching the predetermined value, the spring means exhibit low constant stiffness,

13 motion conversion means for converting linear vibrational motion of the strut to rotational motion, and motor/generator means coupled to the motion conversion means and adapted to combat said rotational motion with generated torque, said torque being a function of the resistivity between a pair of associated contacts; and variable resistance means coupled between the contacts of the motor/generator means and adapted to increase the resistivity thereof at a certain level of vibration of the strut thereby working in combination with the spring means of the strut in order to damp high level vibration of the strut and the structure.

3. An electrodynamic strut as set forth in claim 2 wherein the strut further includes a hollow support cylinder with a first end and a second end, a neutral fixed ring coupled to an interior surface of the support cylinder at a central extent thereof, a telescoping rod with an outboard end and an inboard end with the telescoping rod situated within an interior space of the support cylinder and having a flange formed thereon adjacent to the second end thereof on an outer surface thereof, and an end cap coupled to the second end of the support cylinder with a concentric aperture formed therein for allowing the slidable movement of the telescoping rod within the support cylinder.

4. An electrodynamic strut as set forth in claim 3 wherein the motor/generator means includes a direct current motor/generator with a pair of associated contacts coupled to the first end of the support cylinder with a stator fixed with relation to the support cylinder and a rotor situated within the stator in axial alignment with the telescoping rod, wherein a torque is generated as a function of the resistance between the contacts upon the rotation of the rotor.

5. An electrodynamic strut as set forth in claim 4 wherein the motion conversion means includes a ball screw formed integrally with the rotor and extended axially within the entire length of the support cylinder and further screwably inserted within a threaded bore of the telescoping rod which defines a ball nut, the ball screw supported at the first end of the support cylinder by a pair of thrust bearings secured about the ball screw for allowing the free rotation thereof.

6. An electrodynamic strut as set forth in claim 3 wherein the spring means comprises a first spring compartment and a second spring compartment each including a pair of thrust rings comprising a washer with a flange integrally formed about an aperture thereof and extended normally therefrom, the first spring compartment having a first thrust ring abutting the end cap with the flange thereof extending towards the first end of the support cylinder, a second thrust ring with the washer thereof abutting both the fixed ring and the flange of the telescoping rod in a neutral orientation with the flange of the second thrust ring extending toward the second end of the support cylinder, and a pre-loaded helical spring situated about the telescoping rod between the washer of both the first thrust ring and the second thrust ring, the second spring compartment having a first thrust ring with the washer thereof abutting both the fixed ring and the flange of the telescoping rod in a neutral orientation with the flange of the first thrust ring extending toward the first end of the support cylinder, a second thrust ring abutting the first end of the support cylinder with the flange thereof extending toward the second end of the support shaft, and a pre-loaded helical spring situated between the washer of both the first thrust ring and the second thrust ring.

7. An electrodynamic strut as set forth in claim 2 wherein the variable resistance means includes a passive mode variable resistive network comprising a motor winding resistance and a rectifier circuit connected in series with the contacts of the motor/generator means for producing a direct current at an output of the rectifier circuit, the resistive network further comprising a three port adjustable positive regulator, a potentiometer, and a load resistor connected in series between the output and an input of the rectifier with a line connected between an adjustment port of the adjustable positive regulator and a node positioned between the load resistor and the potentiometer.

8. An electrodynamic strut as set forth in claim 2 and further including a bracing mechanism for reducing the required size of the electrodynamic strut.

9. An electrodynamic strut as set forth in claim 8 wherein the bracing mechanism includes a first pair of braces oriented in a V-shaped configuration with first ends pivotally coupled to a first part of the structure and a second pair of braces oriented in a V-shaped configuration with first ends pivotally coupled to another part of the structure, wherein the braces each terminate at second ends with each second end of the first pair of braces pivotally coupled to an associated second end of the second pair of braces thus defining a pair of pivot joints which vibrate coincidentally upon the vibration of the structure.

10. An electrodynamic strut as set forth in claim 9 and further including a conventional structure comprising a plurality of interconnected horizontal beams and vertical beams defining a multiplicity of rectilinear faces, wherein a plurality of the bracing mechanisms are coupled between the rectilinear faces.

11. An electrodynamic strut as set forth in claim 9 and further including a conventional spatial structure comprising a truss structure having a first plate with six corners and a second plate also with six corners, wherein the second plate is situated above the first plate and a plurality of bracing mechanisms are each coupled between the corners thereof.

12. An electrodynamic strut as set forth in claim 8 wherein the bracing mechanism includes a pair of collapsed T-shaped members each having a horizontally situated elongated extent and a vertically situated short extent centrally coupled to a first end of the elongated extent, the T-shaped members including a first T-shaped member having a second end of the elongated extent thereof pivotally coupled to a stationary point and second T-shaped member having a second end of the elongated extent thereof pivotally coupled to a horizontally movable point, the bracing mechanism further including a first pair of braces oriented in a V-shaped configuration with first ends pivotally coupled to each other thus defining a pivot joint and second ends each coupled to a first end of the short extent of each T-shaped member and a second pair of braces oriented in a V-shaped configuration with first ends pivotally coupled to each other thus defining another pivot joint and second ends each coupled to a second end of each short extent of each T-shaped member, wherein the electrodynamic strut is pivotally coupled between the pivot joints for damping the horizontal movement of the horizontally movable point.

13. An electrodynamic strut as set forth in claim 2 wherein the strut includes a hollow support cylinder with a first end and a second end; a telescoping rod with an outboard end an inboard end with the inboard end situated within an interior space of the support cylinder and the telescoping rod having an indentation centrally formed on an outer surface thereof; and a detent unit coupled to the second end of the strut including a housing having a pair of apertures formed in opposite faces thereof in axial alignment with the hollow support cylinder with the telescoping rod slidably situated therein and a pair of detents forced in communication with the telescoping rod via a pair of belleville springs, whereby the detents insert within the indentations when the telescoping rod is oriented in a neutral configuration.

14. An electrodynamic strut as set forth in claim 2 wherein the strut is adapted for high frequency vibration; the electrodynamic strut including a hollow support cylinder with a first end and a second end; a neutral fixed ring coupled to an interior surface of the support cylinder at a central extent thereof; and a telescoping rod with an inboard end situated within an interior space of the support cylinder with a disk coupled to the inboard end thereof and outboard end, wherein the motion conversion means includes a threaded outer surface of the telescoping rod which defines a ball screw; and an end cap coupled to the second end of the support cylinder; the motor/ generator means including a direct current motor/generator with a pair of associated contacts coupled to the first end of the support cylinder with a stator fixed with relation to the support cylinder and a rotor situated within the stator with a bore formed therein and at least one ball nut with the telescoping rod situated therethrough thereby effecting the rotation of the rotor upon the linear movement thereof, wherein a torque is generated as a function of the resistance between the contacts upon the rotation of the rotor; the spring means including a first spring compartment and a second spring compartment each including thrust rings comprising a washer with a flange integrally formed about an aperture thereof and extended normally therefrom, the first spring compartment having a thrust ring with the washer thereof abutting both a fixed washer centrally fixed within the support cylinder and the disk of the telescoping rod in a neutral orientation with the flange thereof extending toward the second end of the support cylinder and a pre-loaded helical spring situated between the end cap and the thrust ring, the second spring compartment having a thrust ring with the washer thereof abutting both the fixed washer and the disk of the telescoping rod in a neutral orientation with the flange thereof extending toward the first end of the support cylinder and a pre-loaded helical spring situated about the telescoping rod between the rotor and the washer of the thrust ring thereof.

15. An electrodynamic strut coupled between two points within a structure and adapted to damp the vibration of the structure, the strut comprising:

motion conversion means for converting linear vibrational motion of the strut to rotational motion and motor/generator means coupled to the motion conversion means and adapted to combat said rotational motion with generated torque, said torque being a function of the resistivity between a pair of associated contacts; and variable resistance means coupled between the contacts of the motor/generator means and adapted to increase the resistivity thereof at a certain level of vibration of the strut in order to damp high level vibration of the strut and the structure.

* * * * *